March 31, 1931.  R. L. ANTHONY  1,798,647
EDUCATIONAL DEVICE
Filed Jan. 13, 1930
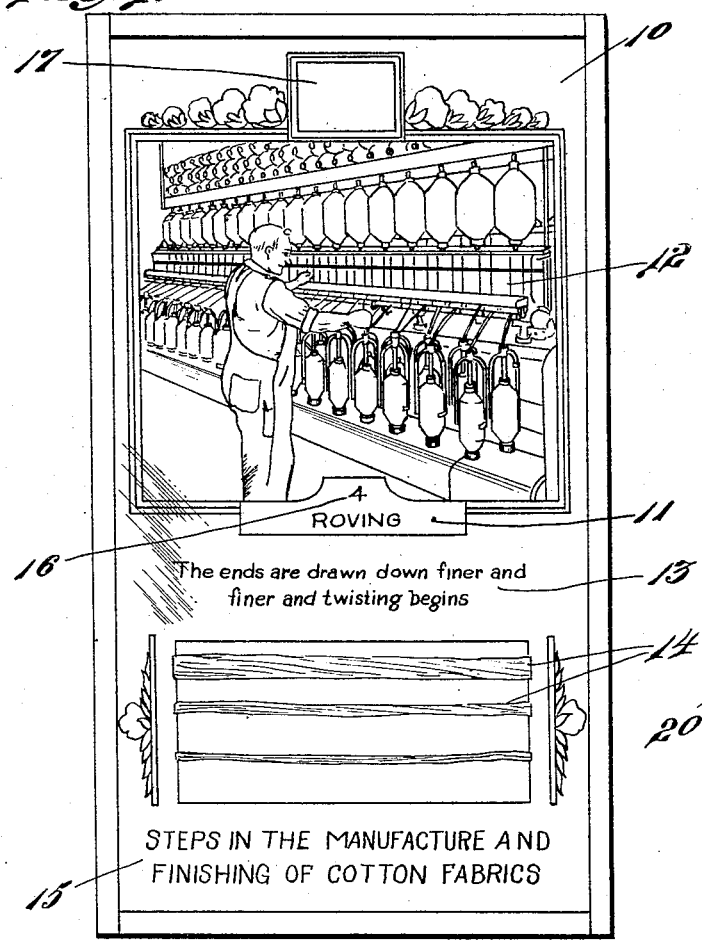
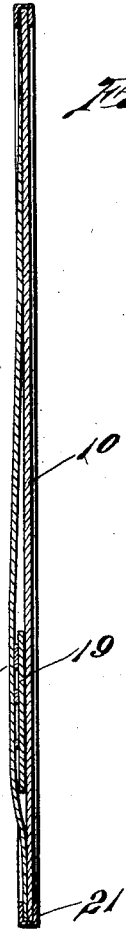
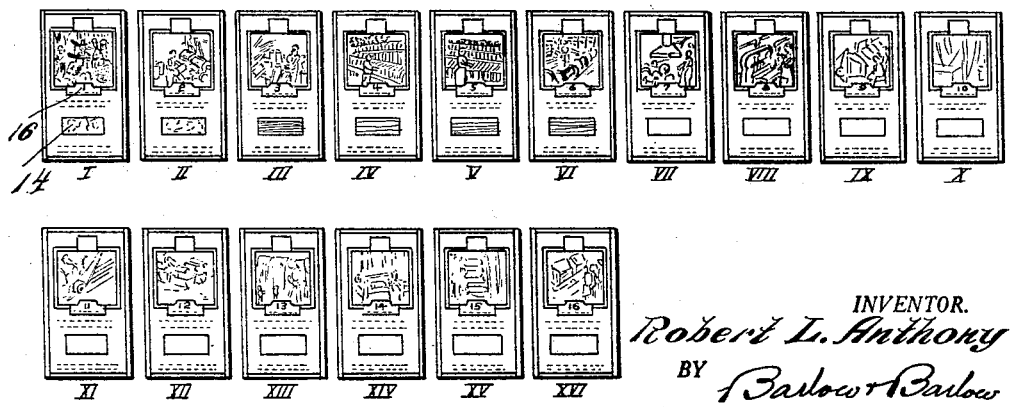
INVENTOR.
Robert L. Anthony
BY Barlow & Barlow
ATTORNEYS.

Patented Mar. 31, 1931

1,798,647

UNITED STATES PATENT OFFICE

ROBERT L. ANTHONY, OF SWANSEA, MASSACHUSETTS, ASSIGNOR TO B. B. & R. KNIGHT CORPORATION, OF PROVIDENCE, RHODE ISLAND, A CORPORATION OF RHODE ISLAND

EDUCATIONAL DEVICE

Application filed January 13, 1930. Serial No. 420,461.

My present invention relates to educational devices, and has particular reference to devices for disclosing processes of manufacture and the like, particularly of well known articles.

One object of the invention is to provide a convenient educational article which groups together pictures of different operations or steps, descriptions of the operations, and a sample of the effect of the operation.

Another object of the invention is to provide a designating index which indicates the relative sequence of the particular operation in the total manufacturing procedure.

A further object is to provide a series of consecutive educational articles which together disclose the complete manufacturing procedure.

With these and other objects and advantageous features in view, the invention consists of novel arrangements of parts more fully disclosed in the detailed description following, in conjunction with the accompanying drawings, and more particularly set forth in the appended claims.

In the drawings:

Fig. 1 is a plan view of an educational article disclosing one step in the process;

Fig. 2 is a central vertical section thereof; and

Fig. 3 shows a series of consecutive articles disclosing a complete manufacturing procedure.

In disclosing the steps entailed in forming a completed article, it has been found desirable to group a description of a single step in the formation with a graphical characterization of the step, and an example of the effect produced by the step. I have therefore devised a series of educational articles, each disclosing a single step and the series disclosing the consecutive steps, each showing the step by description, by illustration, and by a sample of the resulting effect; and the following is a detailed description of a specific embodiment of my invention.

Referring to the drawings, each article, in the present embodiment comprises a plate, card or base sheet 10, the name of an operation or step 11, a pictorial representation of the operation or step 12, a description 13, and a sample or samples 14 showing the result of the operation or step. In addition, each article carries a general title 15, a designation 16 of the sequence of the step or operation in the complete manufacturing or completing process, and a representation or mark 17 which designates the sponsor of the educational articles.

The complete series indicated in Figure 3, thus fully explains how the finished, completed product is obtained, by description, by visual description, and by actual illustration of the effect of each operation or step on the material.

To group the desired effects of each step, preserve them in a uniform relation and to guard against wear and tear during use, a base sheet 10, shown in Figure 2, is printed or otherwise marked, as shown in Figure 1, and a sample or specimen of the material is positioned thereon, the material illustrated in Figure 4 being wound on a cardboard 19 for convenience in securing it to the base sheet, and a transparent protecting cover 20, preferably of celluloid or the like, is positioned over the base sheet, and the base sheet and cover are secured together by edge taping 21 or the like.

A specific embodiment of this invention is illustrated in this application which is the steps in the manufacture and finishing of cotton fabrics.

Each of the steps is depicted on an article designated in the drawing by Roman numerals I to XVI inclusive, and each step is arranged as heretofore described.

The name of the step in the process of finishing cotton fabric with the descriptive phrase appears on each article as follows:

I Cotton Field
Over eight million of 500 lb. bales of cotton are used in the United States each year
II Lapping
Cotton opened, cleaned and put into lap form
III Carding
The important processes of cleaning and making fibres parallel
IV Roving
The ends are drawn down finer and finer and twisting begins
V Spinning
The last drawing and twisting process, the production being warp or filling yarn
VI Warping
The warp yarn wound parallel on beams in preparation for weaving
VII Slashing
The warp yarn is passed through a boiling size and is then ready for the loom beam
VIII Weaving
Combining the warp and filling to produce cloth
IX Inspecting
An extra insurance in the production of satisfactory cloth
X Bleached Cloth
Thousands of yarns are temporarily piled in bins after being fully bleached
XI Mercerizing
Strengthens fibres and adds sheen to the fabric
XII Dyeing
The cloth is passed and repassed through jiggs
XIII Printing
Patterns having from one to seven colors are printed in one operation
XIV Tentering
The cloth which has contracted in width in bleaching is again brought out to correct width
XV Calendering
This is the final finishing process; ironing is done under heavy pressure by heated rolls
XVI Packing
Goods are doubled and rolled and identified with labels.

Each of these articles has a numeral designating its place in the sequence of steps and a picture is also present showing the room or place and the means or machinery for accomplishing each step in the process. For example, I shows a cotton field with the cotton being placed in large baskets by negroes and weighed by the foreman and then dumped into means for further handling it. The remainder of the pictures on the articles all show machinery set up in a factory or mill which performs the operation mentioned, thus we have pictures of II, Lapping machinery; III, Carding machinery; IV, Roving machines; V, Spinning machines; VI, Warping machines; VII, Slashing machines; VIII, Looms for weaving; IX, Machinery for passing the cloth in open form before an inspector; X, A view of the bleaching room with means for delivering the cloth into bins; XI, Mercerizing machinery; XII, Dyeing vats and machinery for passing the cloth into and out of the same; XIII, Printing machines, XIV, Tentering machines; XV, Calendering machines; XVI, Machines for delivering the cloth and tables where operatives are rolling the cloth into bolts and the like.

Also a sample of the goods appear on each article after the operation or step depicted thereon is performed and by comparing one sample with the next an excellent visual realization of just what takes place on the cotton itself is obtained.

Each one of these cards or articles is here illustrated as separate, but a box or suitable container (not shown) is provided in which all may be placed to provide a unit assembly, or any suitable means may be provided for holding the cards together, such as tape to form a folder arrangement or the like to preserve the unity of assembly of the different cards which form the steps in the operation of the finished product desired.

My improved educational device is simple in construction and is very effective in explaining how completed products are obtained. While I have described one specific construction illustrating the principles of my invention, it is obvious that desired changes in construction and in arrangement may be made, within the spirit and the scope of the invention as defined in the appended claim.

I claim:

An educational series for visually and descriptively describing steps in the completion of a product, consisting of a series of separate cards adapted to be juxtaposed for direct comparison, each card having a pictorial representation thereon of one manufacturing step, the title of said step, a written description, a physical example of the effect produced by the step, and an index mark showing the relative position of the step in the series, whereby the successive steps and their effects may be directly compared.

In testimony whereof, I affix my signature.

ROBERT L. ANTHONY.